Aug. 3, 1965    E. B. GRAVES ETAL    3,199,017
VOLTAGE CONTROL MECHANISM UTILIZING A SINGLE CONTROL KNOB
Filed Jan. 12, 1961    2 Sheets-Sheet 1

INVENTOR.
EDWARD B. GRAVES
GERALD V. LYONS
BY
Watts, Edgerton, Pyle & Visher
Attorneys Aug. 3, 1965 E. B. GRAVES ETAL 3,199,017
VOLTAGE CONTROL MECHANISM UTILIZING A SINGLE CONTROL KNOB
Filed Jan. 12, 1961 2 Sheets-Sheet 2

INVENTOR.
EDWARD B. GRAVES
GERALD V. LYONS
BY
Watts, Edgerton, Pyle & Bisher
Attorneys

United States Patent Office 3,199,017
Patented Aug. 3, 1965

3,199,017
VOLTAGE CONTROL MECHANISM UTILIZING A SINGLE CONTROL KNOB
Edward B. Graves, South Euclid, and Gerald V. Lyons, Cleveland, Ohio, assignors to Picker X-Ray Corporation, Waite Manufacturing Division, Inc., Cleveland, Ohio, a corporation of Ohio
Filed Jan. 12, 1961, Ser. No. 82,237
18 Claims. (Cl. 323—43.5)

This invention pertains to voltage control mechanisms, and more particularly to a novel and improved kilovoltage control which is especially suited for control of X-ray mechanisms.

Medical X-ray studies are frequently conducted in darkened rooms. The controls for X-ray mechanisms must be relatively convenient and simple to permit their manipulation with facility and dependability under these darkened conditions. Most X-ray technicians, while highly trained medical people, have limited knowledge of electronic mechanisms and controls. For this reason, and to minimize the training required in order to acquaint personnel with the given X-ray apparatus, it is also highly desirable to have compact, easy-to-operate, and dependable control mechanisms.

X-ray studies require a wide range of kilovoltage control to provide the optimum and proper kilovoltage for all studies. For example, a fluorographic study may be conducted over a relatively protracted period of time with a relatively low X-ray energy level. During such a study, conditions which should be permanently preserved on film may be observed. When such conditions are observed, a high kilovoltage may be imposed across the X-ray tube to provide the high X-ray level desired for good photographic resolution.

The usual system for providing a wide range of kilovoltage control is to utilize two, series-connected, voltage tap switches. These two switches often are referred to as major and minor controls. Each of the switches may, as an example, have ten increments of adjustment. The major switch will have relatively large voltage differential increments to provide, again as an example, a kilovoltage differential of 10 units between each successive adjustment position. The minor adjustment has smaller increments of adjustment which in total will equal one major adjustment.

There may, in the example given, be one kilovolt in the voltage differential between each minor pair of adjustment positions. With such an arrangement the major kilovoltage member is positioned to provide the approximate desired kilovoltage, and the minor is then adjusted to bring the kilovoltage up or down from this position. With the two controls of the example in series, it is possible to obtain from zero to one hundred kilovolts in increments of one kilovolt each.

With the present invention a very wide range of kilovoltage adjustment is obtained with a single control knob. With this mechanism voltage can be very quickly adjusted to any selected level within the adjustment range of the mechanism. To accomplish this, a minor adjustment mechanism with two relatively rotatable elements is provided. Adjustment of the minor control is accomplished by rotating a knob which is secured to a shaft which in turn is secured to one of the rotatable elements of the minor control. A second and major control is provided. The adjustment of the major control is accomplished at least in part by shifting the minor control about a pivotal support to actuate an adjustment mechanism for the major control.

In one embodiment of the invention the movable contact of the major control is pivotally mounted as part of a linkage connected to the shaft of the minor control. Pivotal movement of the minor control shifts the major linkage to provide direct adjustment of the major control.

In another embodiment the major control is a rotatably adjustable mechanism, which includes a shaft connected to one of two rotatable elements. Gears are connected to each of the major and minor control shafts and brought into engagement when the minor control is pivoted in the appropriate direction.

With both embodiments a cam is connected to the minor control shaft. A cam follower is mounted on the frame and engaged by the cam once each revolution. As the cam engages the cam follower when the control arm is rotated, the pivotal members are shifted to index the major control one control position. The minor control can be manually pivoted without reliance on the cam arrangement to provide major control adjustment over its entire range.

Accordingly, one of the principal objects of this invention is to provide a novel and improved voltage control mechanism in which two voltage controls may each be swiftly and positively adjusted over their entire range by a single control knob.

Another object of the invention is to provide a novel and improved control mechanism in which one control is pivotally mounted and a control knob is secured to the one control, and another control is adjusted when the knob and the one control are rotated about a pivot.

Another object of the invention is to provide a voltage control in which a minor control including a shaft is pivotally mounted and a major control is adjusted by a linkage connected to the shaft.

Another object of the invention is to provide a voltage control in which major and minor rotatably adjustable controls are provided and one of the controls is pivotally mounted, each of the controls has a gear connected to its rotatable element, and the gears are selectively brought into adjustment to adjust the major control.

Still another object of the invention is to provide a novel and improved voltage control mechanism in which a cam is secured to the control arm which cam selectively engages a cam follower to at least in part actuate the major control adjustment mechanism.

Other objects and a fuller understanding of the invention may be had by referring to the following description and claims taken in conjunction with the accompanying drawings.

Figure 1:
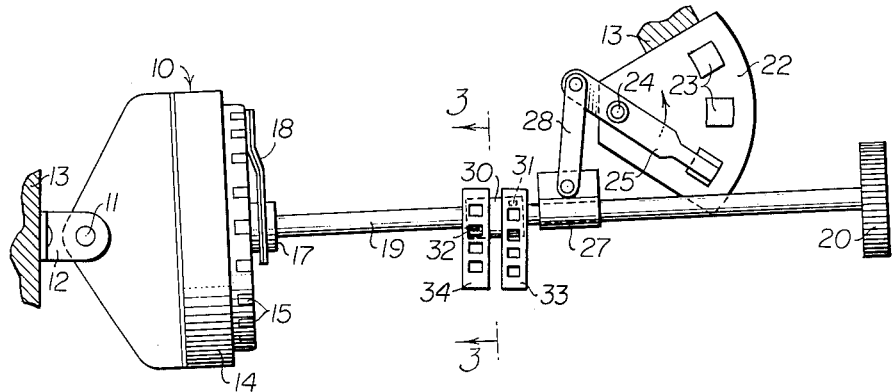
FIGURE 1 is a side elevational view of one embodiment of the invention in one adjustment control position.
Figure 2:
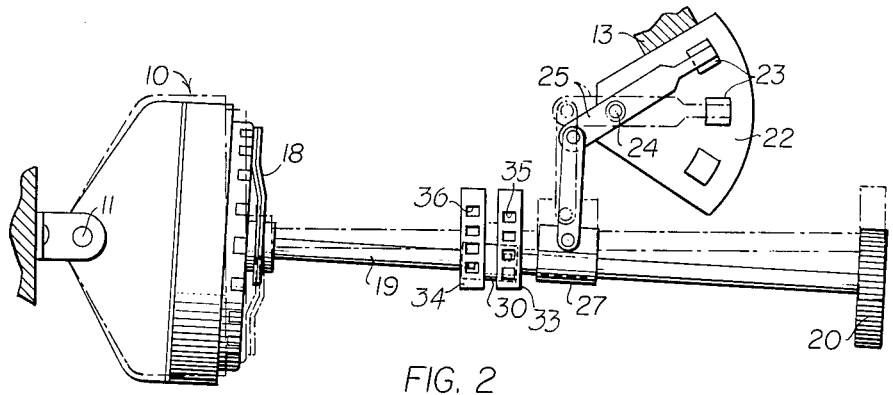
FIGURE 2 is a view corresponding to FIGURE 1 showing the mechanism in another control position and showing a third control position in phantom.
Figure 3:
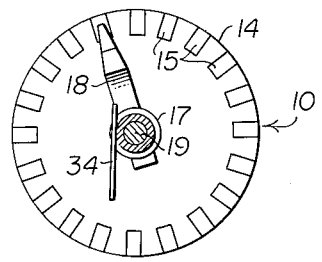
FIGURE 3 is a sectional view of the device of FIGURES 1 and 2, as seen from the plane indicated by the line 3—3 of FIGURE 1.

Referring to the drawings, and to FIGURES 1 through 4 in particular, a minor voltage control is shown generally at 10. A minor control 10 is pivotally connected at 11 to a bracket 12. The bracket 12 is supported on a frame 13.

The minor voltage control 10 includes a multiple contact element 14 which has a plurality of contacts 15. The minor voltage control member 10 includes another element 17 which is rotatable relative to the multiple contact element 14. This second element 17 includes a rotatable contact arm 18, which contacts and forms an electrical connection with the contacts 15 one at a time. A rotatable control shaft 19 is secured to the rotatable element 17. A control knob 20 is fixed to the shaft 19. Rotation of the control knob 20 causes rotation of the control shaft 19 and the connected element 17.

A major control plate 22 is mounted on another portion of the frame 13. The major control plate 22 includes a plurality of contacts 23 which are positioned in an arcuate pattern equal radial distances from a pivot 24. A contact arm 25 is pivotally mounted on the pivot 24, and rotatable about the pivot 24 to selectively engage and electrically connect with the contacts 23 one at a time. The pivotal contact arm 25 has extreme adjustment position shown in solid lines in FIGURES 1 and 2 respectively. An intermediate adjustment position is shown in phantom in FIGURE 2.

A major adjustment control collar 27 is rotatably mounted on the shaft 19. A control link 28 is pivotally connected to the collar 27 and to the contact arm 25. As the shaft 19 is shifted back and forth with the minor voltage control 10 about the pivot 11, the coaction of the contact arm 25, the collar 27, and the control link 28 causes the adjustment of the major control.

When the minor adjustment control 10 reaches one extreme of its adjustment, it is desirable to automatically index the major control one contact position, so that continued rotation of the knob 20 will cause a smooth and continuous change in voltage in the same direction. Thus, if the knob is being rotated in a direction that increases the voltage, and if, for example, the range of the minor control 10 is 40 kilovolts, the voltage will increase units all the voltage applied by the minor control 10 is attained. A shift of the contact 18 from this position to the next contact will drop the adjustment back to minimum voltage tap of the element 10, and thus cause an abrupt drop in the kilovoltage. If the major control is indexed one position at this time, this adjustment from maximum to minimum voltage of the minor control has no effect on the over-all voltage of the mechanism. With the present invention, this indexing of the major control one increment is accomplished automatically when the minor control 10 reaches the limit of its adjustment range.

To accomplish this automatic increment adjustment, a cam member 30 is secured to the shaft 19 to rotate with it. The cam member 30 includes a pair or oppositely directed, axially-spaced, uni-directional cam fingers 31, 32. These fingers 31, 32 are detent like members biased outwardly into position by suitable springs. A pair of spaced, apertured cam plates 33, 34 are secured to another portion of the frame 13. The cam plates 33, 34 include a plurality of spaced cam apertures 35, 36 respectively. The fingers 31, 32 coact respectively with the plates 33, 34.

Figure 4:
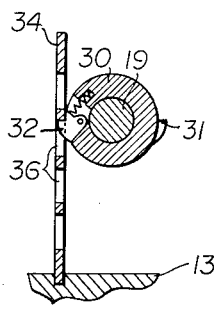
FIGURE 4 is a sectional view of the control cam arrangement of the device of FIGURES 1 and 2, as seen from the plane indicated by the line 4—4 of FIGURE 2.

In FIGURE 4 the coaction of the cam fingers and the cam plates is best illustrated. If the rotation of the shaft 19 is clockwise as viewed in FIGURE 4, from the position of FIGURE 4, the finger 32 will coact with the upper wall of the engaged one of the apertures 36 to cause a downward movement of the control arm 39 as seen in each of the FIGURES 1, 2, and 4. During this rotation the finger 31 will collapse inwardly against the spring when it contacts the plate 33 to clear the plate 33 without adjustment contact. If rotation is in a counterclockwise direction, the finger 31 will coact with the wall of an engaged one of the notches 35 and shift the control arm 19 upwardly as seen in the drawings.

Figures 5, 6:
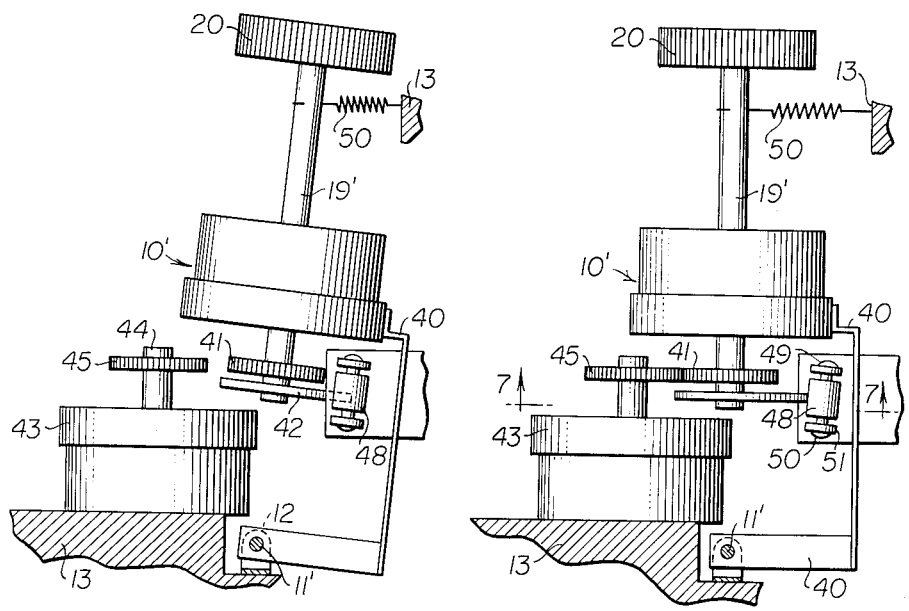
FIGURE 5 is a side elevational view of another form of the invention in one adjustment position.
FIGURE 6 is a view of the embodiment of FIGURE 5 in another adjustment position; and, FIGURE 7 is a sectional view of the device of FIGURES 5 and 6 as seen from the plane by the line 7—7 of FIGURE 6 and in the position of FIGURE 6.

In FIGURES 5 and 6 parts corresponding to the previously described parts of the embodiment of FIGURES 1 through 4 are identified by the same numeral. In those instances where the part is not identical, a prime has been added to the numeral to designate that while the parts correspond, there is some refinement.

The minor control 10' is supported by a bracket 40. The bracket 40 is pivotally mounted at 11' to allow pivotal movement of the minor control 10'. The shaft 19' extends below the control 10'. A control gear 41 and a positioning cam 42 are each secured to the shaft 19' below the control 10'.

Figure 7:
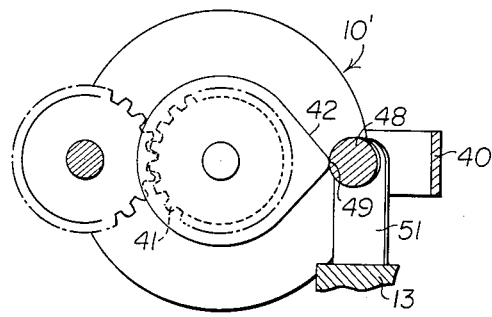

In the embodiment of FIGURES 5-7 the major control is designated by the numeral 43. The major control 43 is a rotatable type similar to the controls 10 and 10'. The rotatable element of the control 43 has an upstanding shaft 44 to which a gear 45 is secured.

When the minor control assembly 10' is pivoted from the position of FIGURE 5 to the position of FIGURE 6, the gears 41, 45 are engaged. When the gears 41, 45 are engaged, rotation of the knob 20 will of course cause rotation adjustment of major control 43. This engagement can be obtained at any time by an operator by manually shifting the minor control assembly until the gears are in engagement and then rotating the knob to provide whatever major adjustment he may wish to make.

At the same time, a cam 42 provides this engagement automatically one each revolution of the minor control. The cam 42 has a high spot 49 which acts against a cam follower 48 once each revolution. The follower 48 is rotatably mounted at 49 and 50 on a bracket 51. The bracket 51 is, in turn, secured to the frame 13.

When high spot 49 of the cam 42 engages the cam follower 48, the minor assembly shifts against the action of spring 50 to bring the gear 41 into engagement with the gear 45. As the high spot 49 on the cam 42 passes out of engagement with the follower 48, the spring 50 will cause the minor assembly to return to its normal or storage position of FIGURE 5. With this construction the major control is indexed one notch for each revolution of the minor control. The total effect is that of a Geneva motion. At the same time, the knob 20 can be urged against the action of the spring 50 at any time to provide adjustment of the major control 43 throughout its entire range if that is desired.

While the invention has been described in detail, it is believed that it essentially comprises an X-ray kilovoltage control device which has two adjustable controls, one of which is pivotally mounted, and an indexing means shiftable with the pivotal member to cause at least part of the other member adjustment.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A voltage control comprising:
   (a) major and minor controls each having a range of voltage adjustment positions;
   (b) a control arm connected to one of the controls for moving the control through a plurality of adjustments from one position to another independent of the other control;
   (c) means interposed between the controls and connecting the other control to the control arm to permit adjustment of the other control through a plurality of adjustments from one position to another independent of the one control; and,
   (d) camming means interposed between said control arm and said other control to index said other control one position each time said one control is moved through a predetermined number of positions.

2. Air electrical control device comprising:
(a) first and second controls;
(b) the first control having a plurality of control positions and including means operable to change its control positions;
(c) said second control having a plurality of adjustment positions and including a rotatable arm operable to change its adjustment positions;
(d) one of said controls being mounted for pivotal movement relative to the other of said controls;
(e) connection means connected to said arm to index the first control from one position to another each time said one control pivots relative to the other control; and,
(f) drive means interposed between said one control and said rotatable arm so that rotation of said arm causes said one control to pivot and thereby index the first control once for each unit of predetermined angular rotation of said arm.

3. The device of claim 2 wherein said one control is said second control.

4. The device of claim 3 wherein the second control is rotatably adjusted.

5. A voltage control device comprising:
(a) major and minor controls;
(b) the major control having a plurality of rough adjustment positions and including means operable to change its rough adjustment positions;
(c) the minor control having a plurality of fine adjustment positions with a predetermined number of said fine adjustment positions corresponding to one of said rough adjustment positions;
(d) said minor control including a rotatable means operable to change its fine adjustment positions;
(e) one of said controls being mounted for pivotal movement relative to the other of said controls;
(f) cam means operatively connected to said rotatable means to pivot said one control each time said rotatable means is changed through said predetermined number of fine adjustment positions; and,
(g) said rotatable means being operatively associated with said first named means to index the major control a predetermined number of said rough adjustment positions each time said one control pivots relative to the other control.

6. A voltage control device comprising:
(a) a frame;
(b) a major voltage control fixed to said frame, said major voltage control having a plurality of rough adjustment voltage positions and a contact arm movable to each of such voltage positions;
(c) a minor voltage control pivotally mounted to said frame, said minor voltage control having a plurality of fine adjustment voltage positions and a contact arm movable to each of such voltage positions;
(d) a predetermined number of said minor control voltage positions corresponding to a lesser predetermined number of the major control voltage positions;
(e) said minor control including a control shaft secured to its contact arm, said control shaft being rotatable to move said contact arm selectively to each of its voltage positions;
(f) lever means interconnecting said control shaft and the contact arm of said major control so that pivotal movement of said minor control indexes said major control contact arm to another voltage position;
(g) cam means carried by said control shaft and coacting with said frame to periodically pivot said minor control to index said major control to another voltage position whenever said control shaft has rotated said minor control contact arm through a predetermined number of voltage positions; and,
(h) said control shaft being movable to interrupt the coaction between said cam means and said frame so that the pivotal movement of said minor control moves said major control contact arm through its entire range of rough adjustment voltage positions without changing the position of said minor control contact arm.

7. The combination of claim 6 wherein a notched cam plate is fixed to said frame and said cam means includes a pivotal finger carried on said control shaft, said finger engaging the notch in said cam plate to cause said minor voltage control to pivot when said control shaft has rotated the minor voltage control arm through said predetermined number of voltage positions.

8. A voltage control device comprising:
(a) major and minor voltage controls each having a control arm, the minor control arm being movable through a plurality of fine adjustment voltage positions, the major control arm being movable through a plurality of rough adjustment voltage positions, each rough adjustment voltage position corresponding to a predetermined number of the fine adjustment voltage positions;
(b) said minor voltage control including a control shaft connected to the minor control arm, said control shaft being rotatable to move such control arm to each of its voltage positions;
(c) one of said voltage controls being mounted for pivotal movement relative to the other control;
(d) said major control including a driven gear means connected to the major control arm, said driven gear means being rotatable to move such control arm to each of its voltage positions;
(e) driving gear means carried by said control shaft and rotatable therewith, said driving gear means engaging said driven gear means when said one control is pivoted toward said other control;
(f) bias means urging said one control away from said other control to maintain said driving gear means normally out of engagement with said driven gear means; and,
(g) cam means carried by said control shaft and rotatable therewith, cam follower means fixed relative to said major control, said cam means engaging said cam follower means to pivot said one control toward said other control each time said minor control arm is moved through said predetermined number of fine adjustment voltage positions so that said driving gear means engages said driven gear means to index said major control to its next voltage position.

9. The combination of claim 8 wherein said one control is the minor control which is pivotally movable against said bias means to cause said driving gear means to continually engage said driven gear means so that rotation of said control shaft moves said major control arm through its entire range of rough adjustment voltage positions without having to move the minor control arm through said predetermined number of fine adjustment voltage positions for each rough adjustment voltage position.

10. A voltage control mechanism comprising, a frame, major and minor control members mounted on the frame, said minor control being pivotally connected to the frame and having a rotatably adjustable element, said minor control including a rotatable control arm connected to the element and movable with the control about said pivot, a cam follower mounted on the frame, a cam secured to the control arm for rotation therewith and abuttable against said cam follower to shift said minor control member about said pivot at least once each revolution, and a major control actuation means connected to one of the control members and operably connected to the other control member to adjust said major control when said minor control is moved about said pivot by the co-action of said cam and said cam follower.

11. A voltage control for actuation by a single control knob comprising, a frame, major and minor rotatably adjustable voltage control members each having a first element rotatable relative to a second element, one of the members being pivotally carried by the frame and the other being fixed to said frame, a rotatable control knob and a cam connected to said one member and each being rotatable with said first element of said one member, a cam follower mounted on the frame and engaged by said cam during rotation of said first element to pivot said one member relative to said frame, and major and minor gears secured to the first elements of said major and minor members respectively and being engageable when said one member is pivoted towards the other member so that further rotation of the first element of said one member causes rotatable adjustment of the first element of said other member.

12. The device of claim 11 wherein a spring urges said one member away from the other member.

13. The device of claim 12 wherein said one member is the minor member.

14. A voltage control device comprising:
(a) a first and second controls each having a control arm selectively movable to a plurality of control positions;
(b) said first control including a control shaft attached to its control arm, said control shaft being rotatable to selectively move the control arm to any of its control positions;
(c) said first control being mounted for movement relative to said second control;
(d) means interposed between said first and second controls to operatively move the control arm of said second control selectively to any of its control positions when said first control is moved relative thereto so that said control shaft is rotated about its longitudinal axis to change the control position of said first control arm and moved other than by such rotation to change the control position of said second control arm; and,
(e) drive means operatively interposed between said control shaft and the control arm of said second control to index the second control one control position each time the first control is moved through a predetermined number of control positions, and said drive means being selectively disengageable to permit adjustment of either of the controls through a plurality of control positions independently of the other control.

15. A voltage control mechanism comprising:
(a) a frame;
(b) a voltage control shaft having a control knob on one end;
(c) means pivotally connecting the other end of said control shaft to the frame;
(d) a variable minor voltage control rheostat having first and second relatively rotatable elements, one of the elements being connected to said shaft and rotatable with said shaft;
(e) a plurality of major voltage control contacts carried by said frame;
(f) a major voltage control linkage connected to the shaft and engageable with the contacts one at a time when said shaft is pivoted relative to said frame to provide major voltage selection; and,
(g) indexing means connected to the shaft and to the frame to cause the shaft to pivot when the shaft revolves thereby shifting said linkage from one contact to a contiguous contact.

16. The device of claim 15 wherein the indexing means comprises a cam carried by the shaft and coacting means carried by the frame.

17. The device of claim 15 wherein the indexing means comprises a pair of oppositely directed unidirectional cam fingers and a pair of notched cam follower members each having a plurality of longitudinally spaced notches, the notches of each of the members being selectively engageable one at a time with one of the cam fingers.

18. The device of claim 15 wherein the linkage includes a pivotal arm having an end selectively engageable with the major contacts one at a time and a connection arm pivotally connected to the pivotal arm and to the minor control and wherein the major contacts are arranged in an arcuate pattern about the pivotal axis of the pivotal arm.

References Cited by the Examiner

UNITED STATES PATENTS

| | | | |
|---|---|---|---|
| 1,613,994 | 1/27 | Grose et al. | 338—123 |
| 1,872,380 | 8/32 | Woods | 200—18 X |
| 2,625,632 | 1/53 | Onia | 338—129 |

LLOYD McCOLLUM, *Primary Examiner.*

RALPH G. NILSON, *Examiner.*

UNITED STATES PATENT OFFICE
CERTIFICATE OF CORRECTION

Patent No. 3,199,017                                              August 3, 1965

Edward B. Graves et al.

It is hereby certified that error appears in the above numbered patent requiring correction and that the said Letters Patent should read as rected below.

Column 3, line 38, for "units" read -- until --.

Signed and sealed this 8th day of March 1966.

)

ST W. SWIDER                                                   EDWARD J. BRENNER
ng Officer                                                            Commissioner of Patents